US012704019B2

(12) United States Patent
Ferraro

(10) Patent No.: US 12,704,019 B2
(45) Date of Patent: Aug. 11, 2026

(54) THERMAL BARRIER FOR SLIDING GLASS DOOR OPENINGS

(71) Applicant: Joseph Jude Ferraro, Peabody, MA (US)

(72) Inventor: Joseph Jude Ferraro, Peabody, MA (US)

( * ) Notice: Subject to any disclaimer, the term of this patent is extended or adjusted under 35 U.S.C. 154(b) by 0 days.

(21) Appl. No.: 19/052,091

(22) Filed: Feb. 12, 2025

(65) Prior Publication Data

US 2025/0198229 A1 Jun. 19, 2025

Related U.S. Application Data

(60) Provisional application No. 63/611,348, filed on Dec. 18, 2023.

(51) Int. Cl.

| | |
|---|---|
| ***E06B 7/23*** | (2006.01) |
| ***E06B 3/263*** | (2006.01) |
| ***E06B 3/46*** | (2006.01) |

(52) U.S. Cl.

CPC ........ *E06B 7/2307* (2013.01); *E06B 3/26347* (2013.01); *E06B 3/4636* (2013.01); *E06B 7/2316* (2013.01); *E06B 2003/26376* (2013.01)

(58) Field of Classification Search

USPC ........................................................ 49/475.1

See application file for complete search history.

(56) References Cited

U.S. PATENT DOCUMENTS 5,007,203 A * 4/1991 Katrynuik ............. E06B 7/2314 49/482.1
5,794,745 A * 8/1998 Gore ....................... E06B 7/367 187/400
8,567,137 B2 * 10/2013 Sullivan ................ E06B 3/4636 49/168
2014/0150348 A1 * 6/2014 Potter ..................... E06B 9/582 49/496.1
2020/0165862 A1 * 5/2020 Cohen ....................... E06B 3/42

FOREIGN PATENT DOCUMENTS

EP 4191013 A1 * 6/2023 ............... E06B 7/22

OTHER PUBLICATIONS

Machine translation of EP4191013A1.*

* cited by examiner

*Primary Examiner* — Marcus Menezes
(74) *Attorney, Agent, or Firm* — Thomas P. O'Connell; O'Connell Law Firm

(57) ABSTRACT

A thermal barrier for sealing an air gap opening in a sliding door structure. The thermal barrier has an elongate base sealing member and an elongate raised sealing member, both formed of resiliently compressible, insulative material, fixed together over the lengths thereof. An insertion portion of the base sealing member extends beyond the raised sealing member and is inserted into the air gap opening between a trailing edge of a first, sliding door and the surface of a second door of the sliding door structure. A plurality of retention members, each with a suction cup portion and a protuberating portion, secure the thermal barrier in position relative to the sliding door structure with the insertion portion of the base sealing member inserted into the air gap opening.

16 Claims, 5 Drawing Sheets

THERMAL BARRIER FOR SLIDING GLASS DOOR OPENINGS

RELATED APPLICATION

This application claims priority to Provisional Patent Application No. 63/611,348, filed Dec. 18, 2023, the entirety of which being incorporated herein by reference.

FIELD OF THE INVENTION

The present invention relates generally to thermal barriers for building structures. More particularly, disclosed herein is a thermal barrier and a method for applying the same in sealing the gap between doors in a sliding door structure. Practices of the invention have particular application to situations wherein one door of the sliding door structure is maintained in a partially opened condition, such as to permit the retention of a pet door insert.

BACKGROUND OF THE INVENTION

Many pet owners seek to permit their pet to travel freely and independently into and out of their home by use of a pet door. Seeking to meet the competing needs of permitting independent passage of a pet while maintaining a sealed entrance to the building structure, numerous types of pet doors have been developed. Permanent installations have been disclosed, such as openings cut into wooden or glass doors and openings disposed within an exterior wall of the building. In other circumstances, pet doors can be removably installed, such as in the case of panel inserts that are interposed between the leading edge of a partially-opened door of a sliding glass door structure and the frame of the structure.

In each case, once installed, the pet doors advantageously permit pets to come and go relative to the home or building without a need for human intervention. The pet has freedom to roam on a porch, in a yard, or otherwise at will without troubling the pet owner in any way.

While advantageous for the freedom and convenience they provide, pet door configurations of the prior art do suffer from certain well-noted disadvantages. One such disadvantage, thermal loss, is particularly apparent in sliding glass door structures. Where a panel insert is disposed between the leading edge of the sliding door panel and the frame structure, it will be recognized that the trailing edge of the sliding door panel is thus laterally displaced relative to the leading edge of the second door panel, which is typically fixed in place. While the trailing edge of the sliding door panel and the leading edge of the fixed door panel normally form a thermal seal when the sliding door panel is fully closed, the lateral displacement of the trailing edge of the sliding door panel produces a continuous open thermal path from the interior of the building to the exterior environment. There is open space between the leading edge of the fixed door panel and the glass of the sliding door panel, and there is an open space between the trailing edge of the sliding door panel and the glass of the fixed door panel.

With this, air and heat can freely pass into and out of the building relative to the exterior environment. In the winter, cold air can rush in while heat freely escapes. In the summer, cooled air is lost to the environment while summer heat is free to enter the interior of the building. The air gap between the sliding doors further provides an open pathway for the entry of insects, dust, pollen, rodents and other pests, outdoor sounds, and still other annoyances.

Many homeowners might keep a pet door in place during temperate conditions, but the massive heat losses due to the wide thermal gap presented by a partially-open sliding door may force them to remove the pet door insert during colder and perhaps warmer months. With that, the freedom of the pet and the convenience to the homeowner are lost. Other homeowners may accept the thermal losses as a price for the convenience of the pet door, but such a practice inevitably leads to higher fuel bills in a time when the price of energy is ever increasing. Still other homeowners may attempt ad hoc solutions that can be unsightly and ineffective.

In view of the foregoing, it is apparent that there is a real and long-felt need for an effective thermal barrier that can be inserted within a sliding door structure to seal and close the thermal gap presented by a partially open sliding door panel in relation to a second door panel.

SUMMARY OF THE INVENTION

The present invention is thus founded on the basic object of providing a thermal barrier for sliding door structures that thermally seals the gap between a partially open sliding door panel and a second door panel.

A related object of the invention is to permit a pet door insert to be applied to a partially open sliding door structure without excess losses of heated or cooled air from within the home or other building.

A further object of the invention is to provide a barrier for being applied to a partially open sliding door structure that prevents the entry of insects, dust, pollen, rodents, exterior sounds, and other undesirable pests and contamination into a home or other building structure through a gap between the sliding doors of the sliding door structure.

Another object of the invention is to provide a thermal barrier for sliding door structures that permit pet door inserts to be maintained in place even during cold and hot months without excess losses in heat.

These and further objects and advantages of the present invention will become obvious not only to one who reviews the present specification and drawings but also to those who have an opportunity to make use of the thermal barrier for sliding glass door structures disclosed herein in operation. However, it will be appreciated that, while the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

In carrying forth one or more of the foregoing objects, an embodiment of the present invention comprises a thermal barrier kit for sealing an air gap opening between a trailing edge of a first, sliding door of a sliding door structure and a surface of a second door of the sliding door structure with an elongate base sealing member and an elongate raised sealing member. The elongate base sealing member has a thickness, a length, a leading longitudinal edge, a trailing longitudinal edge, and a width from the leading longitudinal edge to the trailing longitudinal edge. The elongate raised sealing member can likewise be considered to have a thickness, a length, a leading longitudinal edge, a trailing longitudinal edge, and a width from the leading longitudinal edge to the trailing longitudinal edge. The raised sealing member and the base sealing member are fixed together over the lengths thereof. The base sealing member has an insertion portion that terminates at the leading longitudinal edge of the base sealing member. The insertion portion of the base sealing member has a thickness, and the insertion portion of the base sealing member extends beyond the raised sealing member. With that, the leading longitudinal edge of the base sealing member extends beyond the leading longitudinal edge of the raised sealing member. Under this construction, when the first, sliding door is partially opened, such as to accommodate a pet door insert, the insertion portion of the base sealing member can be inserted into the air gap between the trailing edge of the first, sliding door and the surface of the second door.

In embodiments of the thermal barrier, the trailing edge of the raised sealing member is aligned with the trailing edge of the base sealing member. The base sealing member and the raised sealing member can be integrally formed or affixed together. In either case, the base sealing member and the raised sealing member are formed from a resiliently compressible, insulative material, ideally neoprene.

The thermal barrier can further include a plurality of retention members for securing the thermal barrier in position relative to the sliding door structure with the insertion portion of the base sealing member inserted into the air gap between the trailing edge of the first, sliding door and the surface of the second door. For instance, each of the plurality of retention members can have a suction cup portion and a protuberating portion that projects from the suction cup portion. With that, the suction cup portion of each retention member can be attached to the second door of the sliding door structure by suction while the protuberating portion of the retention member is disposed to contact and retain the trailing edge of the base sealing member.

To facilitate application to a sliding glass door structure, the base sealing member and the raised sealing member can be at least approximately 74 inches in length. With that, the entire air gap opening in the sliding glass door structure can be sealed with a single thermal barrier.

In preferred embodiments, the width of the raised sealing member is approximately one-half of the width of the base sealing member while the trailing edge of the raised sealing member is aligned with the trailing edge of the base sealing member. With this, the insertion portion of the base sealing member extends beyond the leading longitudinal edge of the raised sealing member by approximately one-half of the width of the base sealing member. Such a dimensional relationship provides preferred thermal, acoustic, and debris sealing properties when the thermal barrier is inserted to occupy the air gap opening between the trailing edge of the first, sliding door and the surface of the second door.

Embodiments of the invention may alternatively be described as a sliding door structure and thermal barrier combination. Such a combination includes a sliding door structure with a framework, a first, sliding door retained to slide within the framework, and a second door structure retained by the framework. The first, sliding door has a leading edge and a trailing edge, and an elongate air gap opening is presented between the trailing edge of the first, sliding door of the sliding door structure and a surface of the second door of the sliding door structure when the first, sliding door structure is disposed in a partially-opened position. The thermal barrier again has an elongate base sealing member with a thickness, a length, a leading longitudinal edge, a trailing longitudinal edge, and a width from the leading longitudinal edge to the trailing longitudinal edge. The thermal barrier also again has an elongate raised sealing member with a thickness, a length, a leading longitudinal edge, a trailing longitudinal edge, and a width from the leading longitudinal edge to the trailing longitudinal edge. The raised sealing member and the base sealing member are fixed together over their lengths. The base sealing member has an insertion portion that terminates at the leading longitudinal edge of the base sealing member. The insertion portion has a thickness and extends beyond the raised sealing member. With that, the leading longitudinal edge of the base sealing member extends beyond the leading longitudinal edge of the raised sealing member.

In the combination, the first, sliding door structure is disposed in a partially-opened position, and the insertion portion of the base sealing member is inserted into the air gap opening between the trailing edge of the first, sliding door and the surface of the second door. Furthermore, a plurality of retention members secure the thermal barrier in position relative to the sliding door structure with the insertion portion of the base sealing member inserted into the air gap opening between the trailing edge of the first, sliding door and the surface of the second door. Each of the plurality of retention members can again comprise a suction cup portion and a protuberating portion that projects from the suction cup portion. So constructed, the suction cup portion of each retention member is attached to the second door of the sliding door structure by suction, and the protuberating portion of the retention member is disposed to contact and retain the trailing edge of the base sealing member thus securely but removably retaining the thermal barrier in its insulative, sealing position.

Preferably, the width of the raised sealing member is approximately one-half of the width of the base sealing member with the trailing edge of the raised sealing member aligned with the trailing edge of the base sealing member. Under such constructions, the insertion portion of the base sealing member extends beyond the leading longitudinal edge of the raised sealing member by approximately one-half of the width of the base sealing member thereby to provide preferred thermal, acoustic, and debris sealing characteristics.

The thermal barrier disclosed herein permits the practice of a method for sealing an air gap opening between a trailing edge of a first, sliding door of a sliding door structure and a surface of a second door of the sliding door structure. The method is founded on providing a thermal barrier comprising an elongate base sealing member and an elongate raised sealing member that are joined together or integrally formed. An insertion portion of the base sealing member, which extends beyond the raised sealing member, is inserted into the air gap between the trailing edge of the first, sliding door and the surface of the second door.

In a further step, a plurality of retention members are employed to secure the thermal barrier in position relative to the sliding door structure. Where each retention member comprises a suction cup portion and a protuberating portion that projects from the suction cup portion, the suction cup portion of each retention member can be attached to the second door of the sliding door structure by suction with the protuberating portion of the retention member disposed to contact and retain the trailing edge of the base sealing member.

One will appreciate that the foregoing discussion broadly outlines the more important goals and certain features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

BRIEF DESCRIPTION OF THE DRAWINGS

The present invention will be described and explained with additional specificity and detail through reference to the accompanying drawings wherein.

DETAILED DESCRIPTION OF PREFERRED EMBODIMENTS

The thermal barrier for sliding glass door openings and the method for applying such a thermal barrier disclosed herein are subject to a wide variety of embodiments, each within the scope of the invention. To ensure that one skilled in the art will fully understand and, in appropriate cases, be able to practice the present invention, certain preferred embodiments and applications of the thermal barrier are described below and shown in the accompanying drawing figures. It will be understood, however, that the disclosed embodiments of the thermal barrier are mere examples thereof and should not be considered to be limiting in any manner.

Figure 1:
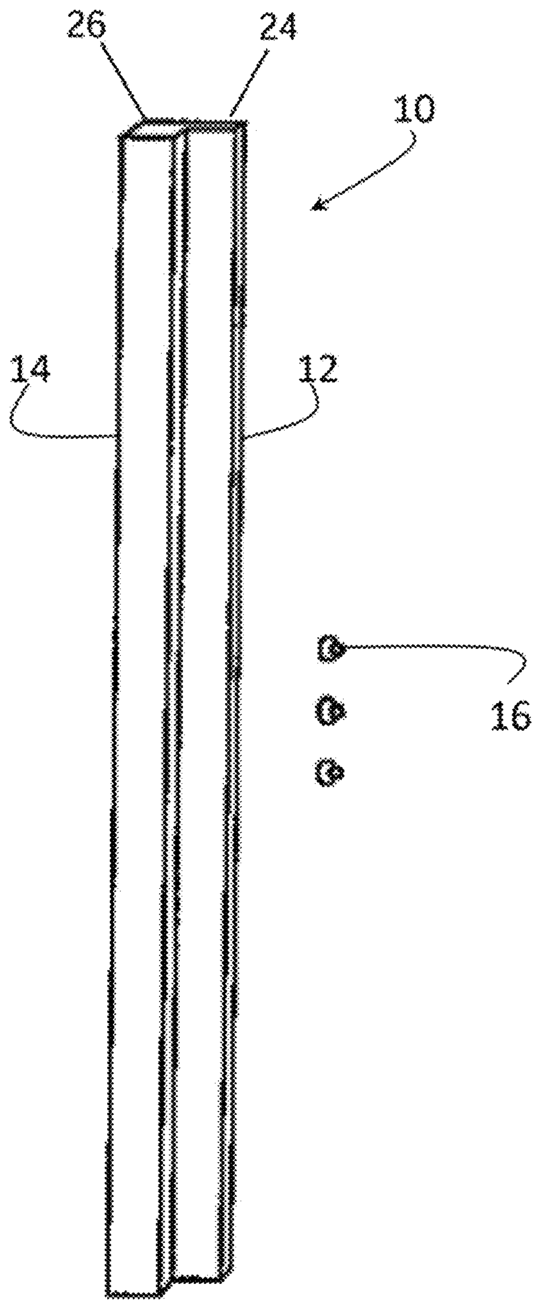
FIG. 1 is a perspective view of a thermal barrier according to the present invention.
Figure 2:
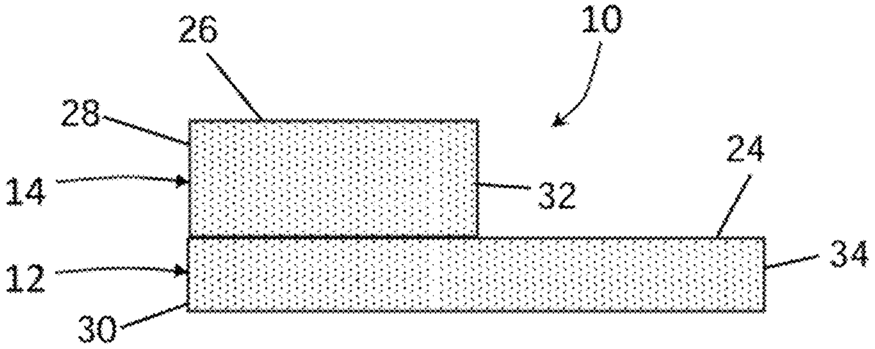
FIG. 2 is a top plan view of an embodiment of the thermal barrier.
Figure 3:
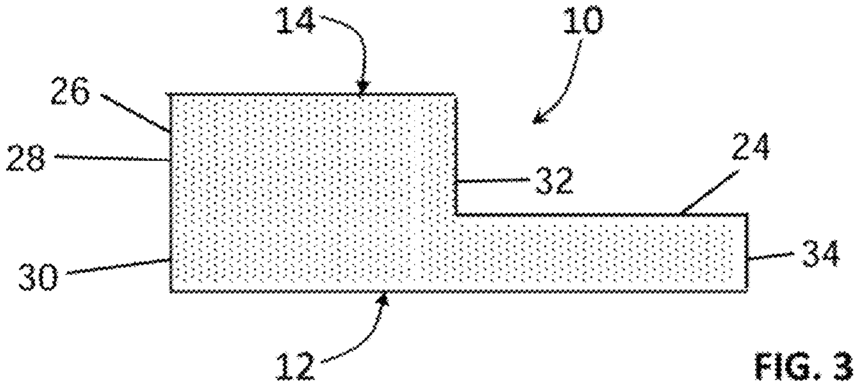
FIG. 3 is a top plan view of an alternative embodiment of the thermal barrier.
Figure 4:
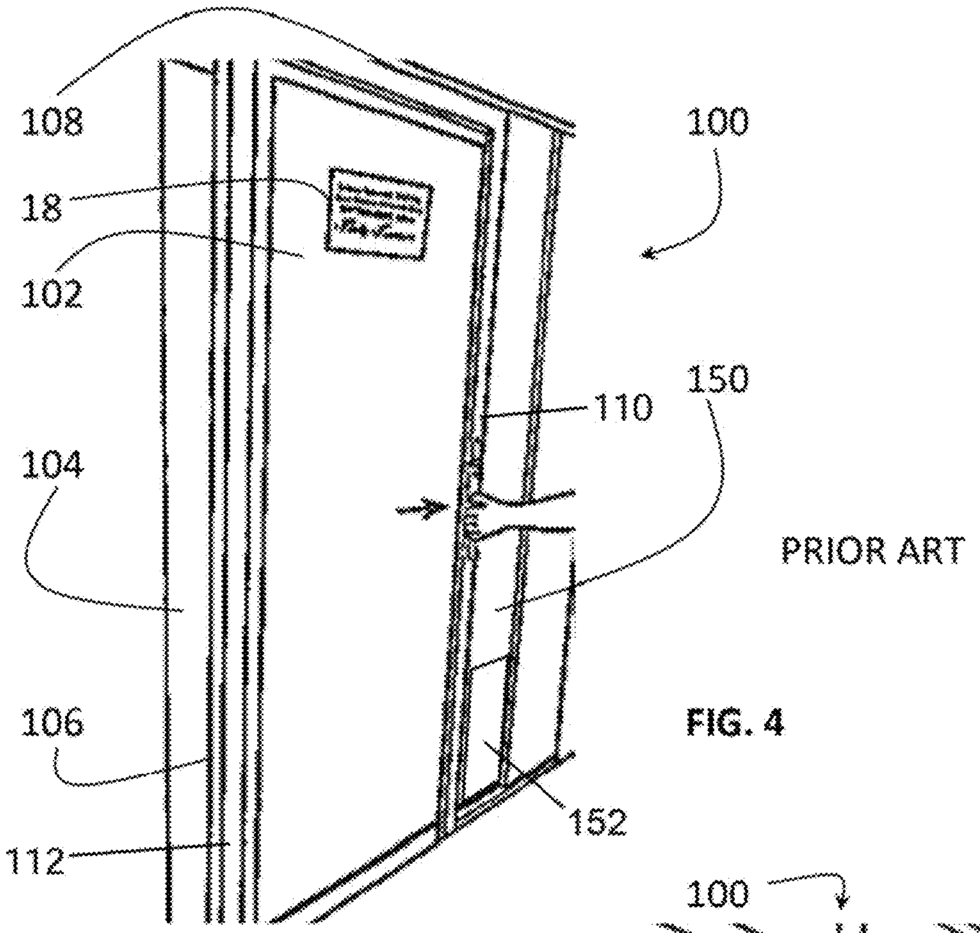
FIG. 4 is a perspective view of a sliding door structure according to the prior art.

Turning more particularly to the drawings, an embodiment of the thermal barrier for sliding glass door openings is indicated generally at 10 in FIGS. 1 through 3. There, one can perceive that the thermal barrier 10 can be formed with a base sealing member 12 and a raised sealing member 14. As in FIG. 2, the raised sealing member 14 can be affixed, such as by lamination, to the base sealing member 12. By way of example and not limitation, the raised sealing member 14 could be affixed to the base sealing member 14 by adhesive, heat melt, ultrasonic welding, fasteners, or any other effective method or combination thereof. In other instances, as in FIG. 3, the base sealing member 12 and the raised sealing member 14 can be integrally formed, such as through an extrusion process or any other suitable formation process.

The base sealing member 12, the raised sealing member 14, and thus the thermal barrier 10 in general are formed from a resiliently-compressible, thermally-insulative material. Numerous such materials would be possible within the scope of the invention except as expressly excluded by the claims. In certain embodiments, the base sealing member 12 and the raised sealing member 14 are formed from rubber. The rubber forming the base sealing member 12 and the raised sealing member 14 can, in particular, comprise neoprene synthetic rubber. Neoprene is advantageous not only for its high insulative value but also for its durability, wear resistance, and its ability to conform as needed in shape and dimensionally due to its resilient compressibility.

The thermal barrier 10 as formed by the base sealing member 12 and the raised sealing member 14 is preferably elongate and of greater length than the height of the air gap in the sliding glass door structure to which it is to be applied. By way of example and not limitation, the thermal barrier 10 can initially be provided in a length of 80 inches, which is calculated to be appreciably longer than the height of the air gap in a typical sliding glass door structure 100. As described further hereinbelow, the thermal barrier 10 can be trimmed to length to match or perhaps to marginally exceed the height of the opening in the sliding glass door structure 100. For instance, it has been found that, during installation, the thermal barrier 10 will commonly be trimmed to have a length of approximately 74 inches, which corresponds to the height of the air gap in what may be considered a standard residential sliding glass door structure 100.

The thicknesses of the base sealing member 12, the raised sealing member 14, and thus the overall thickness of the thermal barrier 10 can individually and collectively vary within the scope of the invention, potentially depending on, among other things, the dimensional characteristics of the subject sliding glass door structure. In certain embodiments, for example, the base sealing member 12 can be of a flat panel shape with a thickness of ¼ inch, ⅜ inch, or some other thickness suitable to the application. The base sealing member 12 in preferred embodiments is approximately 3 inches wide. Whether integrally formed with the base sealing member 12 or fixed thereto, the raised sealing member 14 in certain preferred embodiments of the thermal barrier 10 has a thickness of ½ inch and a width of approximately 1 and ½ inches. The raised sealing member 14 thus has a width of approximately ½ or 50% of the width of the base sealing member 12.

The raised sealing member 14 is affixed to the base sealing member 12 with one longitudinal edge 28 aligned with one longitudinal edge 30 of the base sealing member 12. The longitudinal edge 28 of the raised sealing member 14 may be referred to as a trailing longitudinal edge 28 thereof, and the longitudinal edge 30 of the base sealing member 12 may be referred to as a trailing longitudinal edge 30 thereof. With that, the thermal barrier 10, again in this non-limiting embodiment, has an overall thickness in the area of the raised sealing member 14 of approximately 0.75 or 0.875 inches. Approximately one-half, which equates to 1.5 inches in this example, of the base sealing member 12 extends beyond the second longitudinal edge 32, which may be referred to as the leading longitudinal edge 32, of the raised sealing member 14, and this proportion has been found to be advantageous to the insertion, retention, and thermal and acoustic insulation characteristics of the thermal barrier 10. The portion of the base sealing member 12 extending beyond the second longitudinal edge 32 of the raised sealing member 14 has a leading longitudinal edge 34 and may be referred to as an insertion portion 24, and the portion of the thermal barrier 10 where the base sealing member 12 and the raised sealing member 14 overlap may be referred to as the sealing portion 26.

So constructed, the thermal barrier 10 can be applied to and removed from a sliding glass door structure 100 in the process illustrated in FIGS. 4 through 8. There, one can perceive that the sliding glass door structure 100, which is typical of such structures, has a first glass door panel 102 and a second glass door panel 104. The first and second glass door panels 102 and 104 are retained within a frame structure 108. The first glass door panel 102 is slidable in relation to the second glass door panel 104 and in relation to the frame structure 108 along rails within the frame structure 108. The first glass door panel 102 can thus be referred to as a sliding door panel 102. Where the second glass door panel 104 is fixed in place, it may be referred to as a fixed door panel 104.

Here, the sliding door panel 102 is disposed in a partially open condition so that a pet door insert panel 150 with a pivotable pet door 152 can be interposed between the leading edge 110 of the sliding door panel 102 and the frame structure 108. When the pet door insert panel 150 is so disposed, an air gap 106 is left between the trailing edge 112 of the first, sliding door panel 102 and the glass of the second, fixed door panel 104. The air gap 106 spans from adjacent to the top of the sliding door panel 102 to adjacent to the bottom of the sliding door panel 102.

Figure 5:
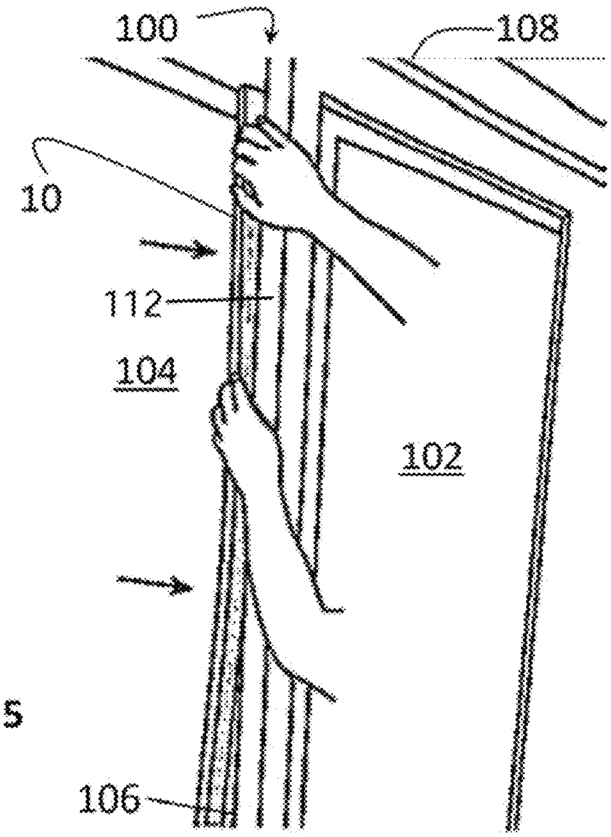
FIG. 5 is a perspective view depicting the application of the thermal barrier disclosed herein to a sliding door structure to form a sliding door structure and thermal barrier combination.

As shown in FIG. 5, the thermal barrier 10 can be applied in a thermal barrier method to seal the air gap 106 thermally to prevent energy losses and physically to prevent the undesirable entry of insects, dust, pollen, rodents, exterior sounds, and other pests and contamination. To do so, the insertion portion 24 of the base sealing member 12 advancing beyond the raised sealing member 14 can be inserted into the air gap 106 between the trailing edge 112 of the first, sliding door panel 102 and the glass of the second, fixed door panel 104, such as until the second edge 32 of the raised sealing member 14 makes contact with the trailing edge 112 of the sliding door panel 102.

The natural, high coefficient of friction between the thermal barrier 10, particularly when formed of neoprene, and the surfaces of the trailing edge 112 of the sliding door panel 102 and the glass of the second door panel 104 and the mechanical engagement therebetween based on the intentionally snug fit and resilient compressibility of the material of the barrier 10 tend to fix the thermal barrier 10 in place without a need for tape or adhesive, which can be messy and inconvenient. However, with reference to FIGS. 1 and 6, it is also disclosed herein to lock the thermal barrier 10 in place by the selective application of a plurality of retention members 16. As depicted apart from the remainder of the thermal barrier 10 in FIG. 8, each retention member 16 comprises a suction cup portion 20 and a protuberating portion 22 that projects from the suction cup portion 20.

Figure 6:
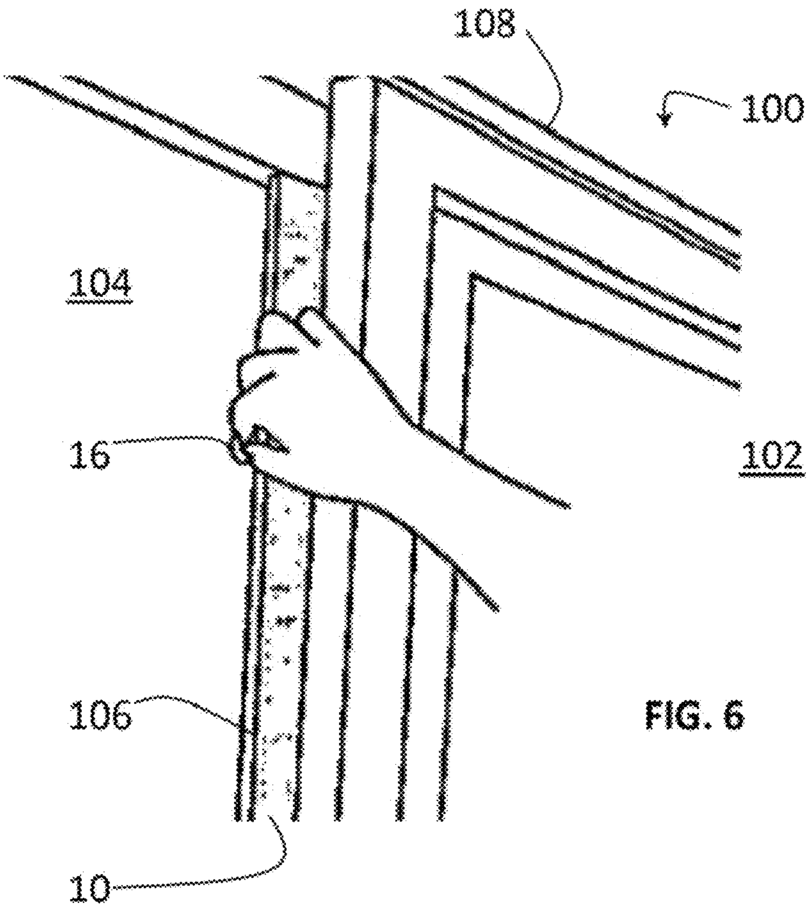
FIG. 6 is a perspective view depicting a further step in the application of the thermal barrier disclosed herein to a sliding door structure.

Under this construction, as is shown in FIG. 6, the several retention members 16 can be affixed via the suction cup portion 20 to the glass of the second, fixed door panel 104 spaced along and immediately against and potentially slightly compressing what is now the trailing edge of the thermal barrier 10 formed by the trailing edges 26 and 30 of the raised sealing member 14 and the base sealing member 12. With this, the thermal barrier 10 can be quickly, conveniently, and securely fixed in place in its position sealing the air gap 106 between the trailing edge 112 of the sliding door panel 102 and the glass of the fixed door panel 104 without a need for tape, adhesive, or other messy or inconvenient fastening methods. Where the thermal barrier 10 is distributed with the plural retention members 16, the thermal barrier 10 and the retention members 16 can be characterized as a thermal barrier kit.

Pursuant to practices of the invention, signage 18 can be additionally applied to the glass of one of the doors 102 or 104 to remind a person intending to slide open the sliding door panel 102 to first remove the thermal barrier 10. The signage 18 can include not only such a warning but also the steps necessary to remove the barrier 10 to permit a free sliding of the sliding door panel 102.

Figure 7:
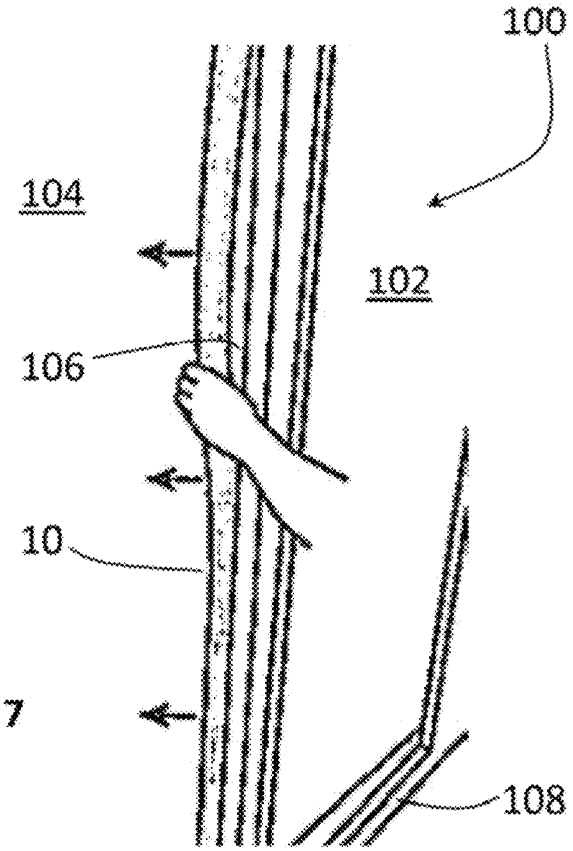
FIG. 7 is a perspective view depicting the removal of the thermal barrier disclosed herein in relation to a sliding door structure.
Figure 8:
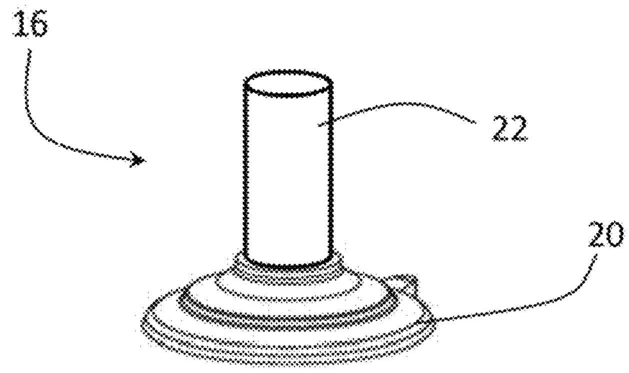
FIG. 8 is a perspective view of a retention member according to the present invention.

When the sliding glass door structure 100 is to be normally operated again, such as to allow the passage of individuals and materials through removal of the pet door insert panel 150, the thermal barrier 10 can be readily removed. To do so, the retention members 16 can first be removed from their position adhered to the fixed door panel 104 securing the thermal barrier 10 in place. Then, as shown in FIG. 7, the insertion portion 24 of the base sealing member 12 of the thermal barrier 10 can be pulled from its position blocking the air gap 106 of the sliding glass door structure 100, and the thermal barrier 10 can be separated from the sliding glass door structure 100 and stored for future reuse. When it is again necessary to retain the first, sliding glass door panel 102 in a partially opened position, such as with the interposition of a pet door insert panel 150, the thermal barrier 10 can be readily reapplied again to prevent energy losses and to physically prevent the entry of insects, dust, pollen, rodents, exterior sounds, and other undesirable pests and contamination.

Thus, without a need for permanent fasteners, the thermal barrier 10 can be quickly and conveniently applied to a sliding glass door structure 100 to seal the air gap 106 between the first, sliding door panel 102 and the second, fixed door panel 104. By virtue of the physical barrier presented by the thermal barrier 10 and the thermally-insulative properties of the barrier 10, excess losses of heated or cooled air from within the home or other building are prevented. Moreover, the barrier 10 prevents the entry of insects, dust, pollen, rodents, exterior sounds, and other undesirable pests and contamination into a home or other building structure as would otherwise be permitted by the air gap 106 between the doors 102 and 104 of the sliding door structure 100. The barrier 10 provides protection against external elements while facilitating the year-round convenience of a pet door insert panel 150 or potentially another structure that might require that the first, sliding door panel 102 be maintained in a partially-opened condition. Where neoprene is used to form the thermal barrier 10, its high insulative value combines with its resistance to water and sound infiltration, its durability, its resilient flexibility, and the high coefficient of friction between it and the components of the sliding door structure 100 to present an effective, convenient, and long-term solution to the inefficient and troublesome air gap 106 that would otherwise permit massive energy losses and the free entry of pests, noise pollution, dust, pollen, and other outside annoyances. Exterior noises are dampened, and an otherwise open air gap 106 becomes a source of efficient thermal and acoustic insulation.

With certain details and embodiments of the present invention for a thermal barrier 10 and the method of applying the same to a sliding glass door structure 100 disclosed, it will be appreciated by one skilled in the art that numerous changes and additions could be made thereto without deviating from the spirit or scope of the present invention. This is particularly true when one bears in mind that the presented preferred embodiments merely exemplify the broader invention revealed herein. Accordingly, it will be clear that those with major features in mind could craft embodiments that incorporate those major features while not incorporating all of the features included in the preferred embodiments.

Therefore, the following claims shall define the scope of protection to be afforded to the invention. Those claims shall be deemed to include equivalent constructions insofar as they do not depart from the spirit and scope of the invention.

It must be further noted that a plurality of the following claims may express, or be interpreted to express, certain elements as means for performing a specific function, at times without the recital of structure or material. As the law demands, any such claims shall be construed to cover not only the corresponding structure and material expressly described in this specification but also all legally-cognizable equivalents thereof.

What is claimed as deserving of Letters Patent is:

1. A thermal barrier kit for sealing an air gap opening between a trailing edge of a first, sliding door of a sliding door structure and a surface of a second door of the sliding door structure, the thermal barrier kit comprising:

a thermal barrier comprising:

an elongate base sealing member with a thickness, a length, a leading longitudinal edge, a trailing longitudinal edge, and a width from the leading longitudinal edge of the base sealing member to the trailing longitudinal edge of the base sealing member; and an elongate raised sealing member with a thickness, a length, a leading longitudinal edge, a trailing longitudinal edge, and a width from the leading longitudinal edge of the raised sealing member to the trailing longitudinal edge of the raised sealing member;

wherein the raised sealing member and the base sealing member are fixed together over the lengths of the raised sealing member and the base sealing member;

wherein the base sealing member has an insertion portion that terminates at the leading longitudinal edge of the base sealing member, wherein the insertion portion of the base sealing member has a thickness, and wherein the insertion portion of the base sealing member extends beyond the raised sealing member whereby the leading longitudinal edge of the base sealing member extends beyond the leading longitudinal edge of the raised sealing member;

a plurality of retention members for securing the thermal barrier in position relative to the sliding door structure with the insertion portion of the base sealing member inserted into the air gap opening between the trailing edge of the first, sliding door of the sliding door structure and the surface of the second door of the sliding door structure, wherein each of the plurality of retention members comprises a suction cup portion and a protuberating portion that projects from the suction cup portion whereby the suction cup portion of each retention member is attached to the second door of the sliding door structure by suction with the protuberating portion of the retention member disposed to contact and retain the trailing edge of the base sealing member;

whereby the insertion portion of the base sealing member can be inserted into the air gap opening between the trailing edge of the first, sliding door of the sliding door structure and the surface of the second door of the sliding door structure.

2. The thermal barrier kit of claim 1, wherein the trailing edge of the raised sealing member is aligned with the trailing edge of the base sealing member.

3. The thermal barrier kit of claim 1, wherein the base sealing member and the raised sealing member are integrally formed.

4. The thermal barrier kit of claim 1, wherein the base sealing member and the raised sealing member are affixed together.

5. The thermal barrier kit of claim 1, wherein the base sealing member and the raised sealing member are formed from a resiliently compressible, insulative material.

6. The thermal barrier kit of claim 5, wherein the base sealing member and the raised sealing member are formed from neoprene.

7. The thermal barrier kit of claim 1, wherein the base sealing member and the raised sealing member are at least approximately 74 inches in length whereby the air gap opening in the sliding glass door structure can be sealed with a single thermal barrier.

8. The thermal barrier kit of claim 1, wherein the width of the raised sealing member is approximately one-half of the width of the base sealing member and wherein the trailing edge of the raised sealing member is aligned with the trailing edge of the base sealing member whereby the insertion portion of the base sealing member extends beyond the leading longitudinal edge of the raised sealing member by approximately one-half of the width of the base sealing member.

9. A sliding door structure and thermal barrier combination comprising:

a sliding door structure with a framework, a first, sliding door retained to slide within the framework, and a second door structure retained by the framework, wherein the first, sliding door has a leading edge and a trailing edge, wherein an elongate air gap opening is presented between the trailing edge of the first, sliding door of the sliding door structure and a surface of the second door structure of the sliding door structure when the first, sliding door is disposed in a partially-opened position;

a thermal barrier comprising an elongate base sealing member with a thickness, a length, a leading longitudinal edge, a trailing longitudinal edge, and a width from the leading longitudinal edge of the base sealing member to the trailing longitudinal edge of the base sealing member and an elongate raised sealing member with a thickness, a length, a leading longitudinal edge, a trailing longitudinal edge, and a width from the leading longitudinal edge of the raised sealing member to the trailing longitudinal edge of the raised sealing member wherein the raised sealing member and the base sealing member are fixed together over the lengths of the raised sealing member and the base sealing member, wherein the base sealing member has an insertion portion that terminates at the leading longitudinal edge of the base sealing member, wherein the insertion portion of the base sealing member has a thickness, and wherein the insertion portion of the base sealing member extends beyond the raised sealing member whereby the leading longitudinal edge of the base sealing member extends beyond the leading longitudinal edge of the raised sealing member;

a plurality of retention members for securing the thermal barrier in position relative to the sliding door structure with the insertion portion of the base sealing member inserted into the air gap opening between the trailing edge of the first, sliding door of the sliding door structure and the surface of the second door of the sliding door structure, wherein each of the plurality of retention members comprises a suction cup portion and a protuberating portion that projects from the suction cup portion wherein the suction cup portion of each retention member is attached to the second door of the sliding door structure by suction with the protuberating portion of the retention member disposed to contact and retain the trailing edge of the base sealing member;

wherein the first, sliding door is disposed in a partially-opened position and wherein the insertion portion of the base sealing member is inserted into the air gap opening between the trailing edge of the first, sliding door of the sliding door structure and the surface of the second door structure of the sliding door structure.

10. The sliding door structure and thermal barrier combination of claim 9, wherein the trailing edge of the raised sealing member of the thermal barrier is aligned with the trailing edge of the base sealing member of the thermal barrier.

11. The sliding door structure and thermal barrier combination of claim 9, wherein the base sealing member and the raised sealing member of the thermal barrier are formed from a resiliently compressible, insulative material.

12. The sliding door structure and thermal barrier combination of claim 9, wherein the width of the raised sealing member is approximately one-half of the width of the base sealing member and wherein the trailing edge of the raised sealing member is aligned with the trailing edge of the base sealing member whereby the insertion portion of the base sealing member extends beyond the leading longitudinal edge of the raised sealing member by approximately one-half of the width of the base sealing member.

13. A method for sealing an air gap opening between a trailing edge of a first, sliding door of a sliding door structure and a surface of a second door of the sliding door structure, the method comprising:

providing a thermal barrier comprising an elongate base sealing member with a thickness, a length, a leading longitudinal edge, a trailing longitudinal edge, and a width from the leading longitudinal edge of the base sealing member to the trailing longitudinal edge of the base sealing member and an elongate raised sealing member with a thickness, a length, a leading longitudinal edge, a trailing longitudinal edge, and a width from the leading longitudinal edge of the raised sealing member to the trailing longitudinal edge of the raised sealing member wherein the raised sealing member and the base sealing member are fixed together over the lengths of the raised sealing member and the base sealing member, wherein the base sealing member has an insertion portion that terminates at the leading longitudinal edge of the base sealing member, wherein the insertion portion of the base sealing member has a thickness, and wherein the insertion portion of the base sealing member extends beyond the raised sealing member whereby the leading longitudinal edge of the base sealing member extends beyond the leading longitudinal edge of the raised sealing member;

providing a plurality of retention members for securing the thermal barrier in position relative to the sliding door structure with the insertion portion of the base sealing member inserted into the air gap opening between the trailing edge of the first, sliding door of the sliding door structure and the surface of the second door of the sliding door structure, wherein each of the plurality of retention members comprises a suction cup portion and a protuberating portion that projects from the suction cup portion;

inserting the insertion portion of the base sealing member into the air gap opening between the trailing edge of the first, sliding door of the sliding door structure and the surface of the second door of the sliding door structure; and attaching the suction cup portion of each retention member to the second door of the sliding door structure by suction with the protuberating portion of the retention member disposed to contact and retain the trailing edge of the base sealing member.

14. The method of claim 13, wherein the width of the raised sealing member is approximately one-half of the width of the base sealing member and wherein the trailing edge of the raised sealing member is aligned with the trailing edge of the base sealing member whereby the insertion portion of the base sealing member extends beyond the leading longitudinal edge of the raised sealing member by approximately one-half of the width of the base sealing member.

15. The method of claim 13, wherein the trailing edge of the raised sealing member of the thermal barrier is aligned with the trailing edge of the base sealing member of the thermal barrier.

16. The method of claim 13, wherein the base sealing member and the raised sealing member of the thermal barrier are formed from a resiliently compressible, insulative material.

* * * * *